United States Patent [19]

Kelty

[11] 4,133,464

[45] Jan. 9, 1979

[54] BACK PACK WITH FLEXIBLE FRAME ASSEMBLY

[75] Inventor: Asher I. Kelty, Glendale, Calif.

[73] Assignee: Kelty Pack, Inc., Sun Valley, Calif.

[21] Appl. No.: 741,333

[22] Filed: Nov. 12, 1976

[51] Int. Cl.² ............................................. A45F 3/00
[52] U.S. Cl. .................................. 224/25 A; 403/190
[58] Field of Search ............... 224/6, 8 R, 9, 10, 11, 224/25 A; 403/190, 234, 235, 237

[56] References Cited

U.S. PATENT DOCUMENTS

| | | | |
|---|---|---|---|
| 3,219,243 | 11/1965 | Mack | 224/25 A |
| 3,265,260 | 8/1966 | Romney | 224/25 A X |
| 3,598,433 | 8/1971 | Savickas | 403/190 |
| 4,018,370 | 4/1977 | Wood | 224/25 A |

Primary Examiner—Trygve M. Blix
Assistant Examiner—Winston H. Douglas
Attorney, Agent, or Firm—Fulwider, Patton, Rieber, Lee & Utecht

[57] ABSTRACT

A back pack having a frame adapted for limited flexing responsive to relative hip and shoulder movement of a hiker. A generally inverted U-shaped main frame unit has side bars that rotate under torsional resistance in a fore and aft direction about a transverse support bar. A cross bar support assembly is coupled to the side bars by fittings that provide for relative rotational and pivotal movement between members of the cross bar assembly and the side bars, thereby permitting such frame flexing.

13 Claims, 8 Drawing Figures

U.S. Patent     Jan. 9, 1979     4,133,464
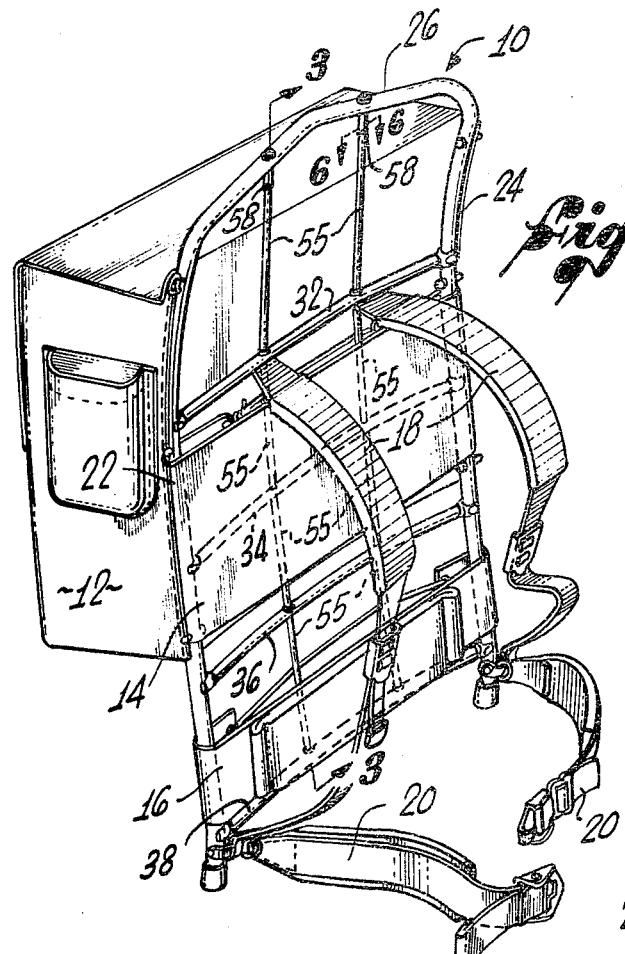

BACK PACK WITH FLEXIBLE FRAME ASSEMBLY

BACKGROUND OF THE INVENTION

This invention relates to a mountaineering back pack and, more particularly, to an improved frame assembly for such a pack which is adapted for limited flexing.

Most back pack frame assemblies of the prior art have included frames having a pair of spaced vertical side bars and a plurality of cross bars extending between them in spaced parallel relation. The side bars and cross bars are bolted, fused or clamped together to form relatively rigid structures. Nylon or canvas bags are then typically secured to the frame assembly for holding at least portions of the load.

This type of frame assembly is in turn supported on the hiker's back by a pair of shoulder straps and also by a hip belt that is cinched tightly around the hiker in the region of the hips. Considerable effort has been directed in recent years toward the design of back packs that are capable of being supported primarily on the hips. It has been determined that such an arrangement is desirable in order to maximize load carrying ability and comfort.

In walking, the hips of the hiker rotate fore and aft about a vertical axis extending generally through the torso. There is also some control-rotational shoulder movement about the same axis, but to a much lesser extent. It is desirable from the load carrying and comfort standpoints that the frame assembly remain in generally parallel relation with the plane of the back during such body movement and closely adjacent thereto, yet not inhibit the relatively free fore and aft rotational movement of the hips.

In an effort to achieve these desired ends, some packs in the past have equipped relatively rigid pack frames with various types of specially designed pivotal and flexible couplings between the pack frames and the hip belt assemblies. These devices have suffered from various deficiencies. In some instances, they simply do not serve to avoid undue restriction of the hips. One approach that does reduce restriction involves providing a universal joint type coupling allowing for relatively free movement between the frame and hip belt assembly. However, this results in a shifting or swaying of the frame and supported load as the hiker walks, producing a generally unstable feeling. Efforts to avoid this instability have been towards the design of generally complicated and inherently expensive devices.

In prior devices which have frame members welded or screwed together, there is some tendency to weaken the structure at the joint. Problems have been minimized by resort to high strength or to heavier materials or to complex joints that rigidly lock the mating parts together. However, these expedients undesirably add to the cost or make the frame heavier, or both. Moreover, all such constructions, in effect, have fulcrum points at the joints about which destructive bending can occur. Further, such constructions are not particularly well suited for absorbing shock loads such as occur when the pack is dropped.

It will be appreciated from the foregoing that there is a need for a back pack frame that is strong and durable, yet simple, lightweight and relatively inexpensive to build and that allows the shoulders and hips to rotate relatively freely and independently, without resulting instability. The present invention fulfills this need.

SUMMARY OF THE INVENTION

The present invention resides in a back pack frame assembly that is, by virtue of its construction, adapted for limited flexing. The flexibility of the frame effectively minimizes the constriction of the hiker's body and thereby significantly increases his load carrying capability and comfort. The flexing capability is achieved by a construction incorporating free-flex couplings for joining the various load bearing structural elements of the pack frame. These couplings allow certain main frame members to move relative to one another in the desired directions. The result is that the desired freedom is achieved without instability. The frame is inherently strong and durable and the distributed nature of the flexing capability provides for improved shock-absorption capability, enabling the pack to suffer considerable abuse without damage.

More particularly, the pack frame includes a pair of main or side bars in spaced and generally parallel relation, connected by a transverse support bar. Counter rotation of the side bars generally about the axis of the support bar is permitted, such movement preferably being yieldably resisted to some degree. Disposed between the side bars and coupled thereto is cross bar means that serves to enhance structural strength and provide for convenient load attachment. Coupling is accomplished by means allowing for relative movement between the cross bars means and side bars, thereby enabling the side bars to rotate fore and aft and the frame to maintain a generally conforming relationship to the hiker's body, notwithstanding relative hip and shoulder movement.

In a more detailed aspect of the invention, the coupling means comprises a plurality of fittings, each of which is rotatably mounted on the end of one of the plurality of cross bars. An end portion of each such fitting is shaped to provide a socket that receives the adjacent portion of the respective side bar. As the side bars rotate, the sockets in turn rotate around the peripheries of the adjacent side bars and the fittings rotate relative to the cross bar. Thus, the fittings serve the intended purpose of coupling the frame parts, yet permitting the desired relative movement.

Positioning of the cross bars vertically along the side bars relative to one another, as well as further enhancement of the pack frame's strength, is achieved in the preferred embodiment by ribs, including elongated rods and spacer sleeves, arranged generally parallel to the side bars and secured to the transverse support bar. With a generally inverted U-shaped frame including the side bars and the transverse bar, the flexing of the frame assembly is progressive over the vertical extent of the main frame unit and the transverse support bar functions as a torsion bar.

Another aspect of the invention involves simple and convenient adjustment of cross bar location by means of removable spacer means that can be snapped onto the elongated rods, thereby changing the lengths of the rib segments between the respective cross bars. This arrangement allows adjustment of the pack frame assembly for accommodating hikers of different physical size and, more particularly, torso length.

It will be appreciated from the foregoing that the present invention represents an advance by virtue of providing a pack frame assembly that is not only more comfortable to the hiker and enhances his load carrying ability, but is stronger and capable, without resort to heavy or special materials, of withstanding shock loads without incurring damage. At the same time, it is inherently simple in construction, easily assembled, and capable of being made at relatively low cost. Other aspects and advantages of the invention will become apparent from the following detailed description taken into conjunction with the accompanying drawings.

BRIEF DESCRIPTION OF THE DRAWINGS

In the accompanying drawings:

FIG. 1 is a perspective view of a complete back pack including a frame assembly constructed in accordance with the present invention, showing it as used with a pair of shoulder straps, back-engaging bands, a hip belt assembly and a flexible pack bag;

FIG. 2 is a perspective view of the pack frame assembly alone, in order to show the detailed structure more clearly;

FIG. 2a is a diagrammatic view in perspective of the pack frame assembly of the invention showing its flexing or deflexing in response to movement of the hiker's hips and upper back;

FIG. 3 is a sectional view on an enlarged scale of the pack frame assembly, taken on the line 3—3 of FIG. 1 with sections of certain parts broken away and removed;

FIG. 4 is a detailed fragmentary sectional view, taken on the line 4—4 of FIG. 2, illustrating one of the flex fittings that couple the cross bar means to the side bars and allow for relative rotational and pivotal movement of the parts;

FIG. 5 is a perspective view of the fitting as shown in FIG. 4;

FIG. 6 is fragmentary sectional view taken on the line 6—6 of FIG. 1, illustrating means including a removable rib insert or spacer means providing for adjustment of the pack for different users; and FIG. 7 is a perspective view of the rib insert or spacer means shown in FIG. 6.

DESCRIPTION OF THE PREFERRED EMBODIMENT

As shown in the drawings, the present invention is embodied in a mountaineering back pack frame assembly 10 that is capable of flexibly conforming generally to the changing contour of the hiker's back as his hips and shoulders rotate during movement. Referring in particular to FIG. 1, the frame assembly 10 is used in conjunction with a flexible pack bag 12 and with back-engaging bands 14 and 16, the lower band 16 being padded for added comfort. Carrying of the frame assembly on the hiker's back is provided for by means of adjustable shoulder straps 18 and an adjustable hip belt assembly 20.

The frame assembly as shown in FIG. 2, includes a pair of side bars 22 and 24 and a transverse support bar 26. In functional terms, the purpose of the transverse bar 26 is to support the side bars 22 and 24 for counter-rotational movement generally about the longitudinal axis of the bar 26. The nature of this rotational movement, which is the basis of the flexing capability of the frame assembly of the invention, is illustrated diagrammatically in FIG. 2a.

Preferably, as illustrated, the side bars 22 and 24 and the transverse bar 26 are formed integrally as a main frame and have a generally inverted U-shaped configuration. With this arrangement, the transverse bar 26 provides limited torsional resistance to the rotational movement of the side bars 22 and 24. As may be seen in FIG. 2a, the extent of movement and, correspondingly, the resistance progressively varies over the vertical extent of the side bars 22 and 24. Movement is, of course, maximum and at the lower ends and the resistance to applied loads is minimum at that location.

The main frame unit may be conveniently formed of an aluminum alloy tubing. Such material is relatively light in weight and has adequate strength, as well as being capable of being conveniently formed into the desired shape by bending. In order to conform the main frame unit to the contour of the human torso, the unit is bowed forwardly in the region of the transverse bar 26, and each of the side bars 22 and 24 is bent slightly rearwardly at the lower ends to avoid interference with the buttocks area.

A cross bar support framework 30, coupled to the main frame unit, serves advantageously to bear and distribute loads. In the preferred embodiment, this grid-like framework 30 is rigid in the sense that it resists collapse and undesired bending or movement of the main frame unit.

As previously noted, an important aspect of the invention resides in the manner in which the cross bars of the framework 30 are movably coupled to the main frame unit. Four such cross bars, designated by the numerals 32, 34, 36 and 38, are shown by way of illustration in the drawing, each rotatably mounting at each end a fitting 40, illustrated in greater detail in FIGS. 4 and 5. The cross bars 32-38 may be made from tubular aluminum alloy stock smaller in diameter than that of the main frame unit, and are bowed slightly as shown to avoid contact with the hiker's back.

Each of the fittings 40 has a cylindrical base portion 42 rotatably received in close bearing engagement in the tubular end of the associated cross bar, e.g., cross bar 32 in FIG. 4. A projecting end portion 44 is shaped to provide a generally semi-cylindrical socket 46 shaped to conform to the contour of the adjacent side bars 22 and 24 so as to receive them in bearing engagement. A shoulder 48 at the juncture of the base portion 42 and end portion 44 abuts the tubular end of the cross bar 32 to serve as a stop. To enhance the bearing engagements, the fittings are preferably made of a low friction plastic material such as that sold under the Delrin trademark.

In view of the construction of the fittings 40 and the manner in which they are mounted, it will be appreciated that each of the cross bars 32-38 may pivot about the longitudinal axis of the side bars 22 and 24. As shown in FIG. 4, this results in the socketed end portion of the fitting 40 sliding about the periphery of side bar 22. By virtue of the nature of the counter-rotational movement of the side bars illustrated in FIG. 2a, relative rotational movement occurs between the cross bars 32-38 and the side bars 22 and 24, such movement being enabled by the turning of the cylindrical base 42 of each fitting within its cross bar. Accordingly, it will be appreciated that the fittings 40 provide for both relative pivotal and rotational movement between the cross bars and associated side bars.

The configuration of the main frame unit and its resistance to outward spreading of the side bars 22 and 24 in cooperation with the socketed end portions of the fittings, aids in holding the main frame unit in assembly with the support framework. The possibility of separation during flexing of the frame assembly is prevented by the back engaging webbing 14 and 16 which comprises bands wrapped tautly around the frame unit, as shown in FIG. 1. The desired counter-rotation of the side bars can still take place, but their separation is maintained essentially constant, thus insuring that the side bars 22 and 24 remain in the sockets of the respective fittings.

The framework 30 further includes a pair of ribs 50 oriented at substantially right angles and spaced substantially equal distance from one another and from the side bars 22 and 24. The ribs 50 serve to suspend the framework from the transverse support bar 26 of the main frame unit and to vertically position the cross bars 32-38 and maintain the desired spacing between them.

Referring to FIGS. 2 and 3, each of the ribs 50 includes an elongated rod 52 that extends over the length of the pack and passes through bores 53 of corresponding diameter in the support bar 26 and the cross bars 32-38. The rods 52 are maintained in assembly with the main frame unit and cross bars by any suitable means as by the machine screws 54 illustrated in FIG. 3. The spacing between the cross bars is established and maintained by sleeves 55, of appropriate length, that are received on the rods 52. The sleeves 55 have an outside diameter larger than the bores 53 through the cross bars or the transverse support bar. Preferably, although not necessarily, washers 56 as shown in FIG. 3 are provided at the junctures between the sleeves and the adjacent cross bars 32-38 and transverse support bar 26. These washers are made of a low friction material such as Delrin plastic and insure against wear at the contact locations.

The relatively rigid nature of the support framework 30, that is, its inherent resistance to distortion from the substantially right angular relationship between the ribs 50 and cross bars 32-38, facilitates the distribution of the pack frame load and prevents damage. On the other hand, the ribs 50 are constructed and positioned so as to permit the desired counter rotation of the side bars 22 and 24. Should the pack be dropped so that the end of the side bars 22 or 24 contacts a relatively hard surface, the load is distributed over the entire frame assembly by the cooperating parts, all of which contribute to the shock-absorption capability.

Because the construction of the pack frame assembly and the fact that no special assembly techniques or operations, such as welding, riveting, staking or the like, are required, it may be quickly and easily assembled. Moreover, any damaged component parts may be readily replaced.

As previously noted, it is desirable to have the pack frame accommodate hikers of various physical size. The relative vertical position of the uppermost cross bar 32 can be adjusted, to a limited extent, by means of removable rib inserts 58. Effectively, this allows adjustment of the relative location of the points at which the shoulder straps 18 are attached to the pack frame assembly 10. The adjustment can be performed without disassembly of any of the structural members of the pack frame. The inserts 58 can be snapped onto the rods 52 either above or below the cross bar 32 to change the effective lengths of the sleeves 55 immediately adjacent such cross bar 32. In FIG. 1, the rib inserts 58 are positioned on the rod segments above the cross bar 32, while in FIG. 2, they are positioned below the cross bar 32.

Each of the rib inserts 58, shown in FIGS. 5 and 6, is in the shape of a sleeve having a longitudinal slot extending the length thereof. Immediately adjacent both edges of such slot and extending over its entire length, are lips 60, for facilitating the manual snap engagement and disengagement of the inserts 58 with the rods 52.

Although the back pack frame assembly has been described with reference to one preferred embodiment, it will be understood by one skilled in the art that modifications may be made that will still embody the spirit of the invention herein described.

I claim:

1. A back pack frame assembly adapted for limited flexing in response to normal use, due to relative hip and shoulder movement of a hiker, comprising:

first and second side bars disposed in spaced and generally parallel relation;

a transverse support bar extending between and connecting said first and second side bars, said support bar and side bars being connected integrally as a unit so as to define a main frame unit, said side bars being connected for limited relative counter-rotational movement about the axis of said transverse bar under normal use conditions to provide flexibility to said main frame unit;

cross bar means including a transversely extending cross bar extending between and interconnecting said side bars; and coupling means movably connecting first and second ends of said cross bar to said first and second side bars, respectively, said coupling means including first and second fittings, each fitting being mounted on one end of said cross bar and adapted to engage a corresponding side bar for free pivotal motion thereabout, each said fitting being pivotable about the longitudinal axis of its corresponding side bar when said main frame is flexed under normal use to produce said counter-rotational movement of said side bars.

2. A frame assembly for a back pack as in claim 1, wherein said transverse support bar yieldably resists counter-rotation of said side bars and is responsive to reduction in the force causing such rotation to return said side bars back toward their original generally parallel relation.

3. A frame assembly for a back pack as in claim 1 wherein:

said cross bar means comprises a plurality of transversely extending cross bars; and said coupling means comprises a plurality of fittings disposed, one each, at the ends of said cross bars.

4. A frame assembly for a back pack as in claim 3 wherein said side bars, said transverse support bar and said cross bars are made of a light-weight metal and said fittings are made of a low friction plastic material.

5. A frame assembly for a back pack as in claim 1 wherein said transverse support bar is formed integrally with said side bars to provide a unitary main frame unit, said unit being formed of a resilient material capable of limited bending, so as to permit relative counter-rotational movement of said side bars in normal use without permanent distortion.

6. A frame assembly for a back pack as in claim 1 wherein said cross bar means includes a framework having a plurality of transversely extending cross bars and a plurality of rib means extending generally parallel to said side bars and connected to said cross bars; and said rib means each including means for spacing said cross bars from one another and adjustment means thereon for adjustably positioning at least one of said cross bars.

7. A frame assembly for a back pack as in claim 1, wherein said transverse support bar is integral with said side bars to form a unitary main frame unit having a generally U-shaped configuration, said transverse support bar providing torsional resistance to said counter-rotational movement of said side bars.

8. A frame assembly for a back pack as in claim 7 wherein each of said fittings has a base portion rotatably mounted on one end of said cross bar and a socketed end portion receiving an adjacent peripheral portion of the associated one of said side bars in bearing engagement, whereby said counter-rotational movement of said side bars causes the socketed end portion of said fitting to slidably rotate about said peripheral portion of its associated side bar.

9. A frame assembly for a back pack as in claim 8 wherein said main frame unit is formed of tubular material and said socketed end portion of each of said fittings has a semi-cylindrical shape of corresponding curvature.

10. A frame assembly for a back pack as in claim 8 further including means engagable with said side bars for maintaining the spacing between said side bars essentially constant to hold said fittings in bearing engagement therewith.

11. A frame assembly for a back pack as in claim 10, wherein said cross bar means is a load-supporting framework including a plurality of transversely extending cross bars and a plurality of rib means extending generally parallel to said side bars and connected to said cross bars, said rib means including means for spacing said cross bars from one another and holding them against movement longitudinally along said side bars;

adjustment means on said rib means for adjustably positioning at least one of said cross bars; and wherein said coupling means comprises a plurality of fittings disposed, one each, at the ends of said cross bars.

12. A frame assembly for a back pack as in claim 1, wherein said transverse support bar interconnects said first and second side bars and provides torsional resistance to said counter-rotational movement.

13. A frame assembly for a back pack as in claim 1, wherein each of said fittings has a base portion rotatably mounted on one end of said cross bar and a socketed end portion receiving an adjacent peripheral portion of the associated one of said side bars in bearing engagement, whereby said counter-rotational movement of said side bars causes the socketed end portion of said fitting to slidably rotate about said peripheral portion of its associated side bar; and further including means engagable with said side bars for maintaining the spacing between said side bars essentially constant to hold said fittings in bearing engagement therewith.

* * * * *